United States Patent [19]
Van Den Berg

[11] Patent Number: 5,665,236
[45] Date of Patent: Sep. 9, 1997

[54] PURIFICATION OF LIQUIDS

[75] Inventor: Zacharias Joseph Van Den Berg, Farm Onder Leeupoort, South Africa

[73] Assignee: Tecroveer (Proprietary) Limited, Westonaria, South Africa

[21] Appl. No.: 603,456

[22] Filed: Feb. 20, 1996

[51] Int. Cl.⁶ .................................................. C02F 3/08
[52] U.S. Cl. .................. 210/619; 210/622; 210/626; 210/151; 210/195.1; 210/262
[58] Field of Search .................................. 210/619, 626, 210/621, 622, 150, 151, 195.1, 195.3, 258, 259, 262, 104

[56]  References Cited

U.S. PATENT DOCUMENTS

| | | | |
|---|---|---|---|
| 3,306,497 | 2/1967 | Medeiros | 210/262 |
| 3,318,449 | 5/1967 | Jennings et al. | 210/104 |
| 3,485,749 | 12/1969 | Reilly | 210/626 |
| 3,575,849 | 4/1971 | Torpey | 210/262 |
| 5,395,529 | 3/1995 | Butler | 210/619 |

FOREIGN PATENT DOCUMENTS

| | | |
|---|---|---|
| 161077 | 11/1985 | European Pat. Off. . |
| 53-123562 | 10/1978 | Japan . |

*Primary Examiner*—Christopher Upton
*Attorney, Agent, or Firm*—Kathleen A. Lyons, Esq.

[57]  ABSTRACT

A system for purifying a liquid including a reactor and a clarifier with the clarifier arranged at an elevated position relative to the reactor so that residue from the clarifier can be returned to the reactor hydrostatically. Liquid in the reactor is aerated using an agitating means with the agitating means also used to transfer liquid from the reactor to the clarifier. The liquid is fed to the clarifier at a constant, controlled rate.

13 Claims, 2 Drawing Sheets

PURIFICATION OF LIQUIDS

FIELD OF THE INVENTION

This invention relates to the purification of liquids. More particularly, the invention relates to a method of, and system for, purifying a liquid. The invention relates particularly, but not necessarily exclusively, to the purification of waste liquids such as sewerage.

SUMMARY OF THE INVENTION

According to a first aspect of the invention, there is provided a method of purifying a liquid which includes feeding liquid to be purified into a receptacle;

agitating the liquid in the receptacle;

transferring the agitated liquid, at a constant controlled rate, to a separating unit; and removing cleaner liquid from the separating unit and returning residue via an outlet of the separating unit to the receptacle.

According to a second aspect of the invention, there is provided a method of purifying a liquid which includes feeding liquid to be purified into a receptacle;

agitating the liquid in the receptacle;

transferring the agitated liquid to a separating unit arranged downstream of the receptacle, the separating unit being configured to have a liquid level therein which is always higher than a maximum liquid level in the receptacle; and removing cleaner liquid from the separating unit and returning residue via an outlet of the separating unit to the receptacle hydrostatically.

In this specification, the term "hydrostatically" is to be understood as meaning that the liquid is transferred by the pressure of fluid in the separating unit without the need for pumps.

The method, according to the second aspect of the invention, may also include controlling the rate of transfer of agitated liquid from the receptacle to the separating unit.

The method may include agitating the liquid by means of an aerating device and utilising the aerating device for transferring the liquid from the receptacle to the separating unit. Hence, the method may include mounting the aerating device in a fixed position relative to the receptacle so that the amount by which the aerating device is submerged in the liquid determines the degree of aeration of that liquid.

Preferably, the method includes utilising an aerating device having at least two independently controllable rotors for controlling the rate of transfer of the liquid from the receptacle to the separating unit.

Further, the method may include arranging a liquid-carrying conduit downstream of the aerating device and depositing liquid from the aerating device into the conduit for transfer to the separating unit.

The conduit may have an overflow means and the method may include mounting the conduit above the receptacle so that overflowing liquid is returned from the conduit to the receptacle in so doing to control the rate of transfer of liquid to the separating unit.

The method may include mounting a control means downstream of the conduit further to control the rate of transfer of liquid to the separating unit.

Finally, the method may include controlling the rate of return of residue from the separating unit to the receptacle.

According to a third aspect of the invention, there is provided a system for purifying a liquid, the system including a receptacle within which liquid to be purified is receivable;

an agitating means arranged within the receptacle for agitating liquid received in the receptacle;

a separating unit having an inlet and an opposed outlet, the outlet being connected via a suitable feed means to the receptacle; and a flow control means arranged intermediate the receptacle and the inlet of the separating unit for controlling the rate of flow of liquid from the receptacle to the separating unit.

According to a fourth aspect of the invention, there is provided a system for purifying a liquid, the system including a receptacle within which liquid to be purified is receivable;

an agitating means arranged within the receptacle for agitating liquid contained in the receptacle; and a separating unit arranged downstream of the agitating means, the separating unit being configured always to have a liquid level therein higher than a maximum liquid level in the receptacle such that residue in the separating unit is returned from the separating unit to the receptacle via a suitable feed means hydrostatically.

The system, in accordance with the fourth aspect of the invention, may also include a flow control means arranged intermediate the receptacle and the separating unit for controlling the rate of flow of liquid from the receptacle to the separating unit.

The receptacle may be in the form of a basin, bath, or the like and is referred to in the art as a reactor.

The flow control means may comprise a trough-like conduit arranged downstream of the agitating means. The trough-like conduit may be open-topped and may be mounted above the reactor such that liquid overflowing from the conduit can be deposited from the conduit into the reactor in so doing to control the rate transfer of liquid from the reactor to the separating unit.

The control means may further include a flow control device, such as an adjustable gate control and weir, arranged downstream of the conduit further to control the rate of transfer of liquid from the reactor to the separating unit.

The agitating means may comprise a rotatable aerating device mounted in a fixed position relative to the reactor and the trough-like conduit so that liquid held captive in the aerating device as it rotates is deposited into the conduit.

Preferably, the aerating device includes at least two independently controllable horizontal cage rotors, each mounted to be rotatable about a fixed horizontal axis, for controlling the supply of liquid to the conduit. The rotors may be at least partially submerged within the liquid contained in the reactor for effecting aeration of the liquid within the reactor. Further, the rotors may serve to raise liquid from the reactor. It will be appreciated that, due to the rotors being fixed relative to the level of liquid in the reactor, the higher the level of the liquid in the reactor, the more the rotors are submerged. Further, it will be appreciated that the amount by which the rotors are submerged determines the degree of aeration of the liquid in the reactor and the more the rotors are submerged, the more aeration takes place.

If desired, a part of the aerating device may be covered by a covering element for assisting in holding the liquid captive in blades of the rotors.

The separating unit may be in the form of a clarifier mounted at an elevated location relative to the receptacle to effect the hydrostatic transfer of the residue from the outlet of the clarifier to the receptacle.

The clarifier may taper towards its bottom end so that the residue is concentrated towards the outlet of the clarifier. Instead of a tapered bottom, the clarifier may have a flat bottom. Then, a displacing device may be arranged in the clarifier for displacing particulate material into the outlet of the clarifier.

A secondary flow control arrangement may be arranged in the feed means from the separating unit to the receptacle. Said secondary flow control arrangement may also comprise a gate control and weir arrangement which may be adjustable.

The invention is now described by way of example with reference to the accompanying diagrammatic drawings.

DETAILED DESCRIPTION OF DRAWINGS

Figure 1:
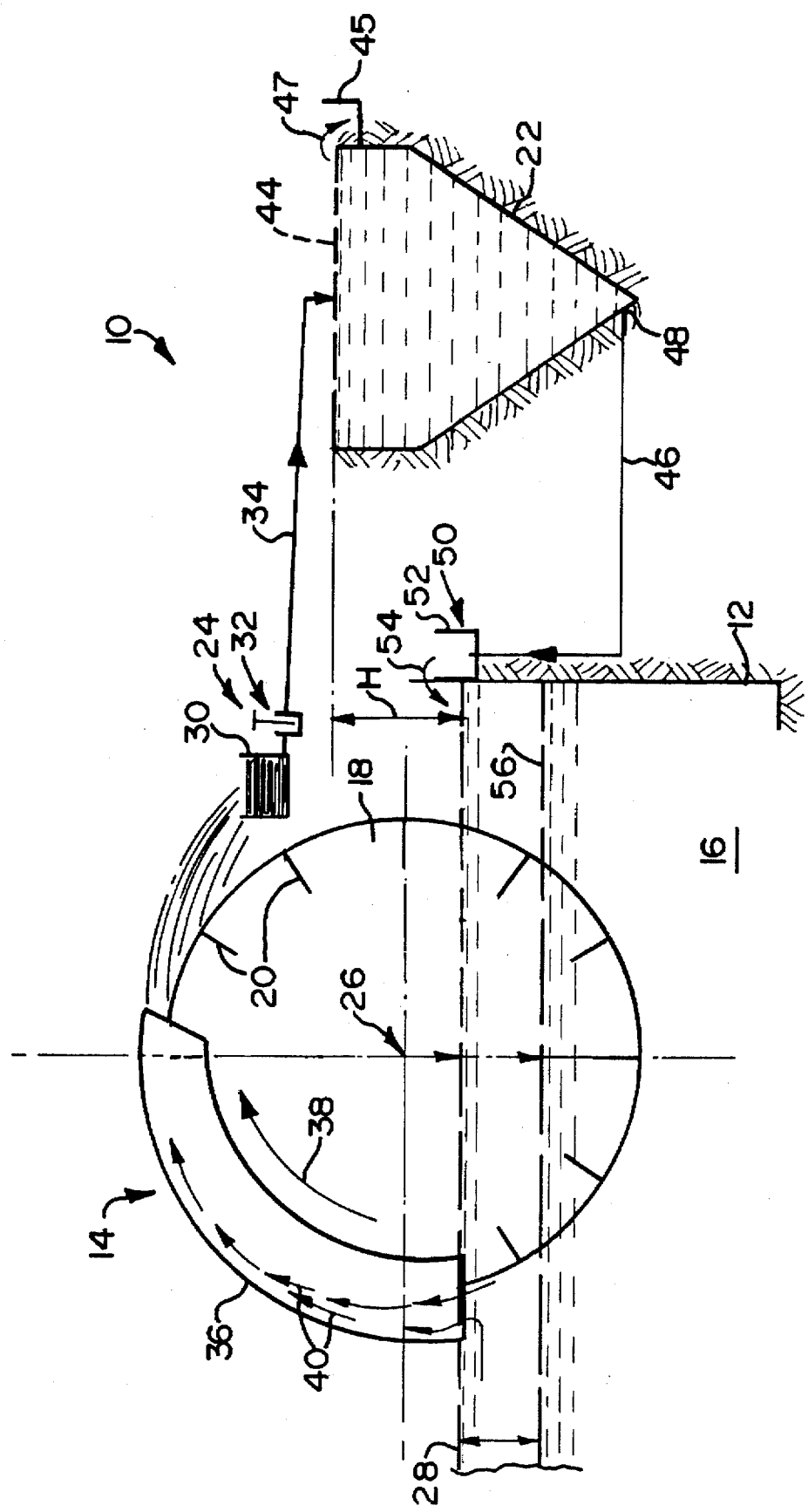
FIG. 1 shows a schematic sectional side view of a system, in accordance with the invention, for purifying a liquid.

Referring firstly to FIG. 1 of the drawings, a system, in accordance with the invention, for purifying a liquid is illustrated and is designated generally by the reference numeral 10. The system 10 comprises a receptacle in the form of a basin or bath, commonly referred to as a reactor 12. Liquid to be purified is receivable in the reactor 12 where it undergoes bacteriological or biological purification.

An agitating means 14 is arranged above the reactor 12 to be partially submerged within liquid 16 contained within the reactor 12. The agitating means 14 comprises a horizontal cage rotor for 18 having a plurality of blades or paddles 20 associated therewith for effecting agitation of the liquid 16 within the reactor 12.

The rotor 18 of the agitating means 14 further serves to feed liquid 16 from the reactor 12 to a separating unit or clarifier 22 arranged downstream of the rotor 18. The liquid 16 is fed from the rotor 18 to the clarifier 22 via a flow control means 24 arranged intermediate the rotor 18 and the clarifier 22. The rotor 18 is so arranged above the reactor 12 that its horizontal, rotational axis 26 is arranged above a maximum level 28 of the liquid 16 within the reactor 12. The vertical position of the axis 26 of the rotor 18 relative to the reactor 12 is fixed. Thus, the more liquid 16 in the reactor 12, the deeper the rotor 18 will be submerged. It will be appreciated that the deeper the rotor 18 is submerged, the more the liquid 16 will be aerated.

The flow control means 24 comprises an open-topped trough-like device or launder 30 arranged at an elevated position relative to the reactor 12. The launder 30 extends in the same direction as the rotational axis 26 of the rotor 18 so that liquid 16 held captive on the blades 20 of the rotor 18 is deposited into the launder 30. The launder 30 is arranged above the reactor 12 such that overflow from the launder 30 is returned to the reactor 12.

The flow control means 24 includes a gate control device 32 arranged downstream of the launder 30 in a conduit 34 leading from the launder 30 to the clarifier 22. The gate control device 32 includes a weir arrangement and is adjustable for setting the desired flow rate from the launder 30 to the clarifier 22 in the conduit 34.

To assist in directing liquid 16 from the blades 20 of the rotor 18 into the launder 30, a cover 36 is arranged over at least part of the rotor 18. Thus, as liquid 16 is drawn from the reactor 12, when the rotor 18 rotates in the direction of arrow 38, liquid 16 is drawn by the blades 20 in the direction of arrows 40 and is held captive by the cover 36 to be deposited into the launder 30.

The clarifier 22 is so arranged relative to the reactor 12 that a liquid level 44 thereof is maintained at a higher level than the maximum level 28 of the liquid 16 in the reactor 12. It will be appreciated that, with this arrangement, a pressure head H is established to effect hydrostatic transfer of residue from the clarifier 22 to the reactor 16 via a feed conduit 46. The feed conduit 46 extends between an outlet 48 of the clarifier 22 and, via a second flow control arrangement 50, to an inlet of the reactor 12.

The clarifier 22 is so configured that it tapers towards the outlet 48 for channelling the residue in the clarifier 22 into the conduit 46. The flow control arrangement 50 also includes a gate device 52 and a weir 54 for effecting control of the returned residue from the clarifier 22 to the reactor 12.

Figure 2:
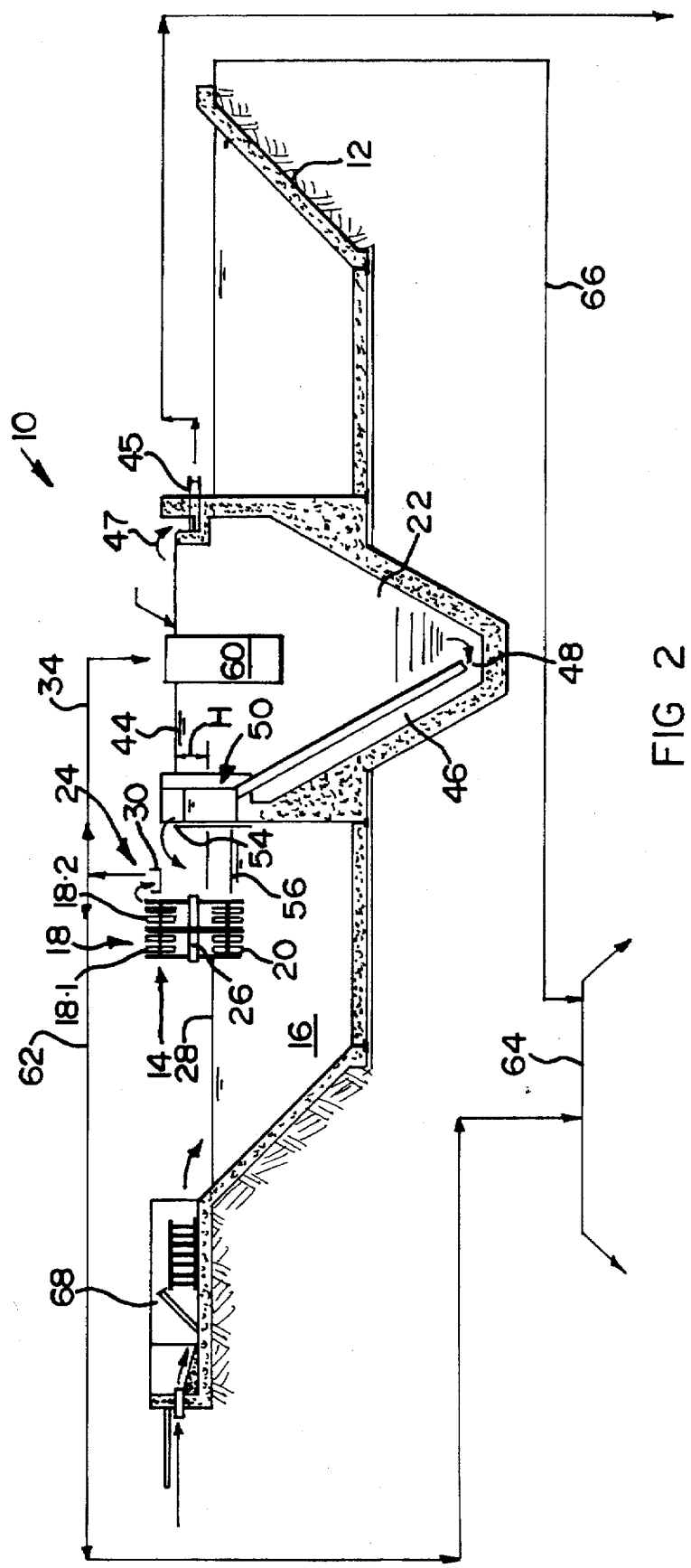
FIG. 2 shows a schematic sectional side view of a developed version of a system, in accordance with the invention, for purifying a liquid.

Referring now to FIG. 2 of the drawings a developed version of the system 10 is shown. With reference to FIG. 1 of the drawings, like reference numerals refer to like parts, unless otherwise specified.

In this embodiment of the invention, the reactor 12 is arranged concentrically about the clarifier 22.

The rotor 18 in accordance with this development of the system 10 comprises two independently controllable rotors 18.1 and 18.2 to cater for extreme surges of liquid 16 into the reactor 12. It will be appreciated that, at lower levels of liquid 16 in the reactor 12 only one of the rotors 18.1 or 18.2 needs to be operated while for higher levels of liquid 16 within the reactor 12 both rotors 18.1 and 18.2 are operated. This serves as a further control of the rate of transfer of liquid 16 from the reactor 12 to the clarifier 22.

Further, liquid from the launder 30 is fed into the clarifier via a so-called stilling drum 60. Also, waste sludge can be fed from the launder 30 via a conduit 62 to a waste dump 64. Also, in this regard, if for any reason accumulated inflow of liquid 16 into the reactor 12 is exceeded, this overflow can be transferred to the waste dump 64 via a conduit 66.

In use, liquid to be purified such as sewerage is conveyed via a supply inlet 68 (FIG. 2) into the reactor 12. At off-peak periods, the liquid 16 is at a level illustrated at 56 in the reactor 12. At peak periods the liquid level approaches the maximum level 28. Normally, to cater for such surges, the clarifier 22 needs to be considerably larger than would otherwise be the case. With the provision of the flow control means 24 intermediate the reactor 12 and the clarifier 22, the rate of flow of liquid from the reactor 12 to the clarifier 22 is controlled thereby obviating the need to cater for surges in the supply of liquid to be purified. Thus, liquid is fed at a variable rate from the reactor 12 into the launder 30. However, with the provision of the gate control 32, the liquid is fed at a constant rate to the clarifier 22 with overflow from the launder 30 being discharged back into the reactor 12. In the case of the two rotors 18.1 and 18.2, two separate launders 30 are provided.

Further, the rate of flow of liquid in the conduit 34 into the clarifier 22 is controlled to maintain the level of liquid within the clarifier 22 at a constant position 44 in the clarifier 22 to maintain the pressure head H. Thus, residue from the clarifier 22 is fed through the conduit 46 hydrostatically back into the reactor 12 for further purification. Purified effluent is discharged from the top of the clarifier 22 into a conduit 45, as indicated by arrow 47.

Hence, it is a particular advantage of the invention that the need for an inordinately large clarifier 22 is obviated by means of the flow control means 24. Further, the need for pumps to return residue from the clarifier 22 is obviated with the elevated arrangement of the clarifier 22 relative to the reactor 12.

What is claimed is:

1. A method of purifying a liquid which includes feeding liquid to be purified into a receptacle;

agitating the liquid in the receptacle by means of an aerating device;

utilizing the aerating device for transferring the agitated liquid to a separating unit arranged downstream of the receptacle, the separating unit being configured to have a liquid level therein which is always higher than a maximum liquid level in the receptacle;

controlling the rate of transfer of agitated liquid from the receptacle to the separating unit by depositing the liquid into a liquid carrying conduit arranged downstream of the aerating device and mounting a control means downstream of the conduit further to control the rate of transfer of liquid to the separating unit; and removing cleaner liquid from the separating unit and returning residue via an outlet of the separating unit to the receptacle hydrostatically.

2. The method as claimed in claim 1 which includes mounting the aerating device in a fixed position relative to the receptacle so that the amount by which the aerating device is submerged in the liquid determines the degree of aeration of that liquid.

3. The method as claimed in claim 1 which includes utilising an aerating device having at least two independently controllable rotors for controlling the rate of transfer of the liquid from the receptacle to the separating unit.

4. The method as claimed in claim 1 which the conduit has an overflow means and in which the method includes mounting the conduit above the receptacle so that overflowing liquid is returned from the conduit to the receptacle in so doing to control the rate of transfer of liquid to the separating unit.

5. The method as claimed in claim 1 which includes controlling the rate of return of residue from the separating unit to the receptacle.

6. A system for purifying a liquid, the system including a receptacle within which liquid to be purified is receivable;

an agitating means arranged within the receptacle for agitating liquid contained in the receptacle;

a separating unit arranged downstream of the agitating means, the separating unit having an inlet and an opposed outlet, the outlet being connected via a feed means to the receptacle and the separating unit being configured always to have a liquid level therein higher than a maximum liquid level in the receptacle such that residue in the separating unit is returned from the separating unit to the receptacle hydrostatically; and flow control means arranged intermediate the receptacle and the separating unit for controlling the rate of flow of liquid from the receptacle to the separating unit, the flow control means comprising a trough-like conduit arranged downstream of the agitating means and a flow control device arranged downstream of the conduit.

7. The system as claimed in claim 6 in which the trough-like conduit is open-topped and is mounted above the receptacle such that liquid overflowing from the conduit can be deposited from the conduit into the receptacle in so doing to control the rate transfer of liquid from the receptacle to the separating unit.

8. The system as claimed in claim 6 in which the agitating means comprises a rotatable aerating device mounted in a fixed position relative to the receptacle and the trough-like conduit so that liquid held captive in the aerating device as it rotates is deposited into the conduit.

9. The system as claimed in claim 8 which the aerating device includes at least two independently controllable rotors for controlling the supply of liquid to the conduit.

10. The system as claimed in claim 8 in which a part of the aerating device is covered by a covering element for assisting in holding the liquid captive in the aerating device.

11. The system as claimed in claim 6 in which the separating unit is in the form of a clarifier mounted at an elevated location relative to the receptacle to effect the hydrostatic transfer of the residue from the outlet of the clarifier to the receptacle.

12. The system as claimed in claim 11 in which the clarifier tapers towards its bottom end so that the residue is concentrated towards the outlet of the clarifier.

13. The system as claimed in claim 6 in which a secondary flow control arrangement is arranged in the feed means from the separating unit to the receptacle.

* * * * *